(12) United States Patent
Fleischer et al.

(10) Patent No.: US 12,145,100 B2
(45) Date of Patent: Nov. 19, 2024

(54) SHIP WITH A CARBON DIOXIDE CAPTURE SYSTEM

(71) Applicant: Karbon CCS Ltd, Valletta (MT)

(72) Inventors: Henrik Fleischer, Slependen (NO); Knut Erik Børseth, Sandefjord (NO)

(73) Assignee: KARBON CCS LTD, Valletta (MT)

( * ) Notice: Subject to any disclaimer, the term of this patent is extended or adjusted under 35 U.S.C. 154(b) by 0 days.

(21) Appl. No.: 18/271,560

(22) PCT Filed: Jan. 12, 2022

(86) PCT No.: PCT/NO2022/050012
§ 371 (c)(1),
(2) Date: Jul. 10, 2023

(87) PCT Pub. No.: WO2022/154672
PCT Pub. Date: Jul. 21, 2022

(65) Prior Publication Data
US 2024/0066465 A1    Feb. 29, 2024

(30) Foreign Application Priority Data

Jan. 12, 2021   (NO) .................................. 20210041

(51) Int. Cl.
*B01D 53/62*    (2006.01)
*B01D 46/66*    (2022.01)
(Continued)

(52) U.S. Cl.
CPC ............ *B01D 53/62* (2013.01); *B01D 46/66* (2022.01); *B01D 53/343* (2013.01); *B01D 53/78* (2013.01);
(Continued)

(58) Field of Classification Search
CPC ...... B01D 53/62; B01D 46/66; B01D 53/343; B01D 53/78; B01D 53/96; B01D 53/00;
(Continued)

(56) References Cited

U.S. PATENT DOCUMENTS

| | | |
|---|---|---|
| 6,655,150 B1 | 12/2003 | Asen et al. |
| 2008/0104958 A1 | 5/2008 | Finkenrath et al. |
| 2009/0025390 A1* | 1/2009 | Christensen ........... F23J 15/006 60/645 |

FOREIGN PATENT DOCUMENTS

| | | |
|---|---|---|
| CN | 205730896 | 11/2016 |
| EP | 3354869 | 8/2018 |

(Continued)

OTHER PUBLICATIONS

PCT International Search Report and Written Opinion for International Application No. PCT/No. 2022/050012 filed on Jan. 12, 2022; 5 pgs.
(Continued)

*Primary Examiner* — Deming Wan
(74) *Attorney, Agent, or Firm* — Alix, Yale & Ristas, LLP

(57) ABSTRACT

A ship with a flue gas carbon dioxide capture and storage plant has a main engine such as a slow running diesel engine providing flue gas. The flue gas is led via a flue gas heat exchanger with a thermal fluid exit to a re-boiler and arranged for cooling said flue gas. Further cooled flue gas is led into a turbine compressor compressing it up to a compressed flue gas. A combustion chamber is provided with a fuel feed and a pre-mix gas burner for afterburning said compressed flue gas which also burns remaining methane from the diesel engine, resulting in hot afterburned compressed flue gas enriched in $CO_2$. The CO2-absorber (20) leading said $CO_2$-enriched absorber solution to a $CO_2$-
(Continued)

stripper (21), operating at e.g. 1 Bar and exporting CO2 to a CO2-compressor (26) to a $CO_2$-export line (28) to onboard $CO_2$ pressure tanks.

8 Claims, 2 Drawing Sheets

(51) Int. Cl.
  *B01D 53/34* (2006.01)
  *B01D 53/78* (2006.01)
  *B01D 53/96* (2006.01)
  *F01N 3/08* (2006.01)
  *F17C 5/06* (2006.01)
  *F23G 7/06* (2006.01)
  *F23J 15/04* (2006.01)

(52) U.S. Cl.
  CPC ............... *B01D 53/96* (2013.01); *F01N 3/08* (2013.01); *F17C 5/06* (2013.01); *F23G 7/065* (2013.01); *F23J 15/04* (2013.01); *B01D 2251/306* (2013.01); *B01D 2251/606* (2013.01); *B01D 2257/504* (2013.01); *B01D 2258/018* (2013.01); *B01D 2259/4566* (2013.01); *B01D 2259/65* (2013.01); *F17C 2205/0323* (2013.01); *F17C 2221/013* (2013.01); *F17C 2227/0157* (2013.01); *F17C 2227/0348* (2013.01); *F17C 2270/0105* (2013.01)

(58) Field of Classification Search
  CPC ..... F01N 3/08; F17C 5/06; F23G 7/065; F23J 15/04
  See application file for complete search history.

(56) References Cited

FOREIGN PATENT DOCUMENTS

| WO | WO2017042163 | 3/2017 |
| WO | WO2019172772 | 9/2019 |

OTHER PUBLICATIONS

Norwegian Search Report for Norwegian Application No. 20210041 filed on Jan. 12, 2021; 2 pgs.

* cited by examiner

SHIP WITH A CARBON DIOXIDE CAPTURE SYSTEM

BACKGROUND

Slow steaming has become the main stream of shipping for the reduction of fuel, cost and emissions. Additionally, LNG (liquid natural gas) may be used as fuel and is recommended for cost savings and GHG emission reduction. However, methane is not completely burned in a slow running ship engine.

WO 2017042163 A1 discloses a method and plant for capturing $CO_2$ from a $CO_2$ containing exhaust gas, where the exhaust gas is compressed and thereafter cooled before the exhaust gas is introduced into an absorber, where the exhaust gas is brought in counter-current flow with an aqueous $CO_2$ absorbent solution, to give a lean exhaust gas that is withdrawn from the absorber, reheated against incoming compressed exhaust gas, and thereafter expanded and released into the atmosphere, where the aqueous $CO_2$ absorbent solution is an aqueous potassium carbonate solution, and that the steam and $CO_2$ withdrawn from the regenerator is cooled in a direct contact cooler by counter-current flow of cooling water, to generate a gaseous flow of cooled $CO_2$ and steam that is withdrawn for compression and drying of the $CO_2$, and a liquid flow of cooling water and condensed steam that is withdrawn and flashed, to give a cooled liquid phase that is recycled as cooling water for the direct contact cooler for the withdrawn $CO_2$ and steam, and a gaseous phase that is compressed and thus heated, and introduced into the regenerator as stripping steam.

WO 2019172772 A1 concerns a method and a plant for capturing $CO_2$ from an incoming flue gas. The flue gas can be exhaust gas from coal and gas fired power plants, cement factories or refineries. The incoming exhaust gas is cooled, mixed with air and compressed, and thereafter introduced into a combustion chamber together with gas and/or liquid fuel. Part of the combustion is achieved by separate burners with cooling/combustion air feed with a volume equal to the volume of $CO_2$ captured. Said burners will elevate the temperature in the combustion chamber allowing combustion of exhaust gas with low oxygen content. $CO_2$ is captured at high partial pressure before expansion by the gas turbine to produce power and generate steam in the heat recovery unit. The gas turbine will operate with high efficiency close to design parameters with respect to inlet temperature, pressure and flow.

SUMMARY

Disclosed herein are embodiments of a ship with a flue gas carbon dioxide capture and storage plant, said ship comprising
- a main engine (1) such as a slow running diesel or gas driven engine (1) arranged for providing a flue gas (FG),
- an exhaust block and bleed valve unit (2) for said flue gas (FG) arranged in an exhaust funnel,
- an exhaust fan (3) is arranged after said exhaust block and bleed valve unit (2),
- whereupon a self-cleaning filter (4) is arranged before,
- a flue gas heat exchanger (6) with a thermal fluid exit (5) arranged for feeding a re-boiler (22), said flue gas heat exchanger (6) arranged for cooling said flue gas (FG),
- a flue gas cooler (7) is arranged thereafter for cooled flue gas (FG), with vapour drain, and arranged for further cooling flue gas (FG),
- a compressor (9) is then arranged for compressing said further cooled flue gas (FG) up to a compressed flue gas (CFG), said compressor (9) being common-axial with a expander (10), said expander (10) arranged for expanding resulting $CO_2$-reduced flue gas (CRFG),
- a high pressure shell of a HTHE (14) is arranged after said compressor (9) and said high pressure shell of said HTHE (14) is further connected to a high pressure shell of a combustion chamber (13) also arranged for said compressed flue gas (CFG),
- said combustion chamber (13) enveloped by a perforated inner wall arranged for receiving said compressed flue gas (CFG),
- said combustion chamber (13) comprising a fuel feed (11) and a pre-mix gas burner (12) arranged for afterburning said compressed flue gas (CFG) and also arranged to burn out remaining methane from said slow running diesel engine,
- wherein the combustion chamber (13) is arranged to result in hot afterburned compressed flue gas (ACFG) thus enriched in $CO_2$,
- said afterburned compressed flue gas (ACFG) is arranged to be heat exchanged in said HTHE (14) with returning resulting $CO_2$-reduced flue gas (CRFG), which is arranged to heat $CO_2$-reduced flue gas (CRFG) and further leading said heated $CO_2$-educed flue gas (CRFG) to said expander (10),
- wherein said HTHE (14) cools said afterburned compressed flue gas (ACFG),
- said HTHE (14) is further connected to an SCR (16) arranged for reducing a NOx content of said cooled afterburned compressed flue gas (ACFG),
- a LTHE (17) is arranged for further cooling of said afterburned compressed flue gas (ACFG),
- said LTHE (17) arranged for heat exchanging with said cooled returning resulting $CO_2$-reduced flue gas (CRFG) which shall go to said HTHE (14),
- a condenser (18) arranged for further cooling of said cooled, afterburned compressed flue gas (ACFG),
- and further arranged for conducting said cooled afterburned compressed flue gas (ACFG) sent through one or more $CO_2$-absorber columns (20) arranged for exchanging $CO_2$ into a $K_2CO_3$/water solution and forming $CO_2$-reduced flue gas (CRFG) and further arranged to returned said CRFG via a re-humidifier (19), through said LTHE (17) and further via said HTHE (14) and to said expander (10) which is arranged for generating electrical energy at generator (8);
- said $CO_2$-absorber (20) arranged for leading said $CO_2$-enriched absorber solution to a $CO_2$-stripper (21) and further arranged for exporting $CO_2$ to a $CO_2$-compressor (26) to a $CO_2$-export line (28) to onboard $CO_2$ pressure storage tanks,
- wherein a re-boiler (22) is arranged for heating said $CO_2$-stripper (21) circulating said thermal fluid from said exit (5) and further arranged for returning cooled $CO_2$-lean absorber fluid to a pump arranged for feeding an absorbent ($K_2CO_3$/water) heat exchanger (23) back to the top of said absorber columns (20).

Also disclosed herein is a method for carbon dioxide capture and storage plant onboard a ship, the method comprising the steps of;
- providing a flue gas (FG) by running a main engine (1) such as a slow running diesel or gas driven engine (1),
- leading said flue gas (FG) through an exhaust block and bleed valve unit (2) in an exhaust funnel;

and through an exhaust fan (3) after said exhaust block and bleed valve unit (2),
and through a self-cleaning filter (4),
and further through a flue gas heat exchanger (6) with a thermal fluid exit (5) feeding a re-boiler (22), said flue gas heat exchanger (6) cooling said flue gas (FG),
further cooling said cooled flue gas (FG) in a flue gas cooler (7), with vapour drain,
said further cooled flue (FG) in a compressor (9) compressing it up to a compressed flue gas (CFG), said compressor (9) being common-axial with a expander (10), said expander (10) arranged for expanding resulting $CO_2$-reduced flue gas (CRFG),
said compressed flue gas (CFG) feed into a high pressure shell of a HTHE (14), wherein said high pressure shell of said HTHE (14) is further fluid connected to a high pressure shell of a combustion chamber (13),
feeding said compressed flue gas (CFG) through a perforated inner wall enveloping said combustion chamber (13),
afterburning said compressed flue gas (CFG) in said combustion chamber (13) using a fuel feed (11) and a pre-mix gas burner (12), which also burns out remaining methane from said slow running diesel engine,
thus resulting in hot afterburned compressed flue gas (ACFG) thus enriched in $CO_2$,
heat exchanging said afterburned compressed flue gas (ACFG) in said HTHE (14) producing returning resulting $CO_2$-reduced flue gas (CRFG), thus heating $CO_2$-reduced flue gas (CRFG) and further leading said heated $CO_2$-educed flue gas (CRFG) to said expander (10),
wherein said HTHE (14) cools said afterburned compressed flue gas (ACFG),
then subsequently reducing a NOx content of said cooled afterburned compressed flue gas (ACFG) in an SCR (16) connected from said HTHE (14),
further cooling of said afterburned compressed flue gas (ACFG) in a LTHE (17), heat exchanging said afterburned compressed flue gas (AFCG) with said cooled returning resulting $CO_2$-reduced flue gas (CRFG) which is conducted to said HTHE (14),
further cooling of said cooled, afterburned compressed flue gas (ACFG) in a condenser (18),
and conducting said cooled afterburned compressed flue gas (ACFG) through one or more $CO_2$-absorber columns (20) exchanging $CO_2$ into a $K_2CO_3$/water solution and forming $CO_2$-reduced flue gas (CRFG) and further returning said CRFG via a re-humidifier (19), through said LTHE (17) and further via said HTHE (14) and to said expander (10) and generating electrical energy at generator (8) connected to said expander (10);
leading said $CO_2$-enriched absorber solution from said $CO_2$-absorber (20) to a $CO_2$-stripper (21) and exporting $CO_2$ to a $CO_2$-compressor (26) to a $CO_2$-export line (28) to onboard $CO_2$ pressure storage tanks,
heating said $CO_2$-stripper (21) using a re-boiler (22), circulating said thermal fluid from said exit (5) and further returning cooled $CO_2$-lean absorber fluid to a pump feeding an absorbent ($K_2CO_3$/water) heat exchanger (23) back to the top of said absorber columns (20).

BRIEF DESCRIPTION OF THE DRAWINGS

The invention is illustrated in the attached drawings, wherein.

DETAILED DESCRIPTION

Figure 1:
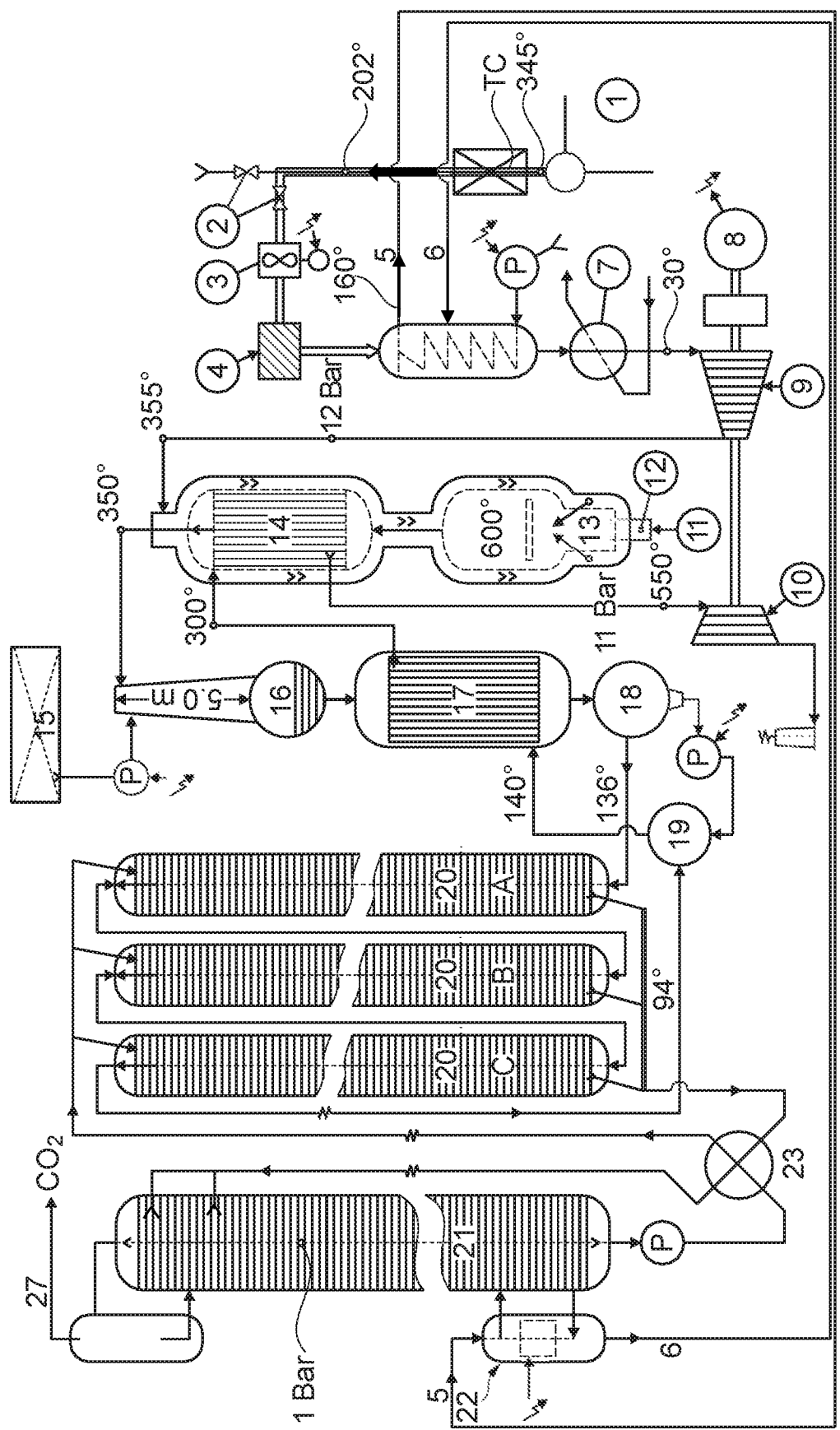
FIG. 1 is a simplified vertical section sketch of a first embodiment of a flue gas carbon dioxide capture and storage plant according to the disclosure, with relevant approximate temperatures and pressures indicated in the drawings.

Disclosed herein is a ship with a flue gas carbon dioxide capture and storage plant.
More specifically, disclosed herein is a ship with a flue gas carbon dioxide capture and storage plant, said ship comprising
a main engine (1) such as a slow running diesel or gas driven engine (1) arranged for providing a flue gas (FG),
an exhaust block and bleed valve unit (2) for said flue gas (FG) arranged in an exhaust funnel,
an exhaust fan (3) is arranged after said exhaust block and bleed valve unit (2),
whereupon a self-cleaning filter (4) is arranged before,
a flue gas heat exchanger (6) with a thermal fluid exit (5) arranged for feeding a re-boiler (22), said flue gas heat exchanger (6) arranged for cooling said flue gas (FG),
a flue gas cooler (7) is arranged thereafter for cooled flue gas (FG), with vapour drain, and arranged for further cooling flue gas (FG),
a compressor (9) is then arranged for compressing said further cooled flue gas (FG) up to a compressed flue gas (CFG), said compressor (9) being common-axial with an expander (10), said expander (10) arranged for expanding resulting $CO_2$-reduced flue gas (CRFG),
a high pressure shell of a HTHE (14) is arranged after said compressor (9) and said high pressure shell of said HTHE (14) is further connected to a high pressure shell of a combustion chamber (13) also arranged for said compressed flue gas (CFG),
said combustion chamber (13) enveloped by a perforated inner wall arranged for receiving said compressed flue gas (CFG),
said combustion chamber (13) comprising a fuel feed (11) and a pre-mix gas burner (12) arranged for afterburning said compressed flue gas (CFG) and also arranged to burn out remaining methane from said slow running diesel engine,
wherein the combustion chamber (13) is arranged to result in hot afterburned compressed flue gas (ACFG) thus enriched in $CO_2$,
said afterburned compressed flue gas (ACFG) is arranged to be heat exchanged in said HTHE (14) with returning resulting $CO_2$-reduced flue gas (CRFG), which is arranged to heat $CO_2$-reduced flue gas (CRFG) and further leading said heated $CO_2$-educed flue gas (CRFG) to said expander (10),
wherein said HTHE (14) cools said afterburned compressed flue gas (ACFG),
said HTHE (14) is further connected to an SCR (16) arranged for reducing a NOx content of said cooled afterburned compressed flue gas (ACFG),
a LTHE (17) is arranged for further cooling of said afterburned compressed flue gas (ACFG),
said LTHE (17) arranged for heat exchanging with said cooled returning resulting $CO_2$-reduced flue gas (CRFG) which shall go to said HTHE (14), a condenser (18) arranged for further cooling of said cooled, afterburned compressed flue gas (ACFG), and further arranged for conducting said cooled afterburned compressed flue gas (ACFG) sent through one or more $CO_2$-absorber columns (20) arranged for exchanging $CO_2$ into a $K_2CO_3$/water solution and forming $CO_2$-reduced flue gas (CRFG) and further arranged to returned said CRFG via a re-humidifier (19), through said LTHE (17) and further via said HTHE (14) and to said expander (10) which is arranged for generating electrical energy at generator (8);

said $CO_2$-absorber (20) arranged for leading said $CO_2$-enriched absorber solution to a $CO_2$-stripper (21) and further arranged for exporting $CO_2$ to a $CO_2$-compressor (26) to a $CO_2$-export line (28) to onboard $CO_2$ pressure storage tanks, wherein a re-boiler (22) is arranged for heating said $CO_2$-stripper (21) circulating said thermal fluid from said exit (5) and further arranged for returning cooled $CO_2$-lean absorber fluid to a pump arranged for feeding an absorbent ($K_2CO_3$/water) heat exchanger (23) back to the top of said absorber columns (20).

Also disclosed herein is a method for carbon dioxide capture and storage plant onboard a ship, the method comprising the steps of;

providing a flue gas (FG) by running a main engine (1) such as a slow running diesel or gas driven engine (1), leading said flue gas (FG) through an exhaust block and bleed valve unit (2) in an exhaust funnel;

and through an exhaust fan (3) after said exhaust block and bleed valve unit (2), and through a self-cleaning filter (4), and further through a flue gas heat exchanger (6) with a thermal fluid exit (5) feeding a re-boiler (22), said flue gas heat exchanger (6) cooling said flue gas (FG), further cooling said cooled flue gas (FG) in a flue gas cooler (7), with vapour drain, said further cooled flue (FG) in a compressor (9) compressing it up to a compressed flue gas (CFG), said compressor (9) being common-axial with a expander (10), said expander (10) arranged for expanding resulting $CO_2$-reduced flue gas (CRFG), said compressed flue gas (CFG) feed into a high pressure shell of a HTHE (14), wherein said high pressure shell of said HTHE (14) is further fluid connected to a high pressure shell of a combustion chamber (13), feeding said compressed flue gas (CFG) through a perforated inner wall enveloping said combustion chamber (13), afterburning said compressed flue gas (CFG) in said combustion chamber (13) using a fuel feed (11) and a pre-mix gas burner (12), which also burns out remaining methane from said slow running diesel engine, thus resulting in hot afterburned compressed flue gas (ACFG) thus enriched in $CO_2$, heat exchanging said afterburned compressed flue gas (ACFG) in said HTHE (14) producing returning resulting $CO_2$-reduced flue gas (CRFG), thus heating $CO_2$-reduced flue gas (CRFG) and further leading said heated $CO_2$-educed flue gas (CRFG) to said expander (10), wherein said HTHE (14) cools said afterburned compressed flue gas (ACFG), then subsequently reducing a NOx content of said cooled afterburned compressed flue gas (ACFG) in an SCR (16) connected from said HTHE (14), further cooling of said afterburned compressed flue gas (ACFG) in a LTHE (17), heat exchanging said afterburned compressed flue gas (AFCG) with said cooled returning resulting $CO_2$-reduced flue gas (CRFG) which is conducted to said HTHE (14), further cooling of said cooled, afterburned compressed flue gas (ACFG) in a condenser (18), and conducting said cooled afterburned compressed flue gas (ACFG) through one or more $CO_2$-absorber columns (20) exchanging $CO_2$ into a $K_2CO_3$/water solution and forming $CO_2$-reduced flue gas (CRFG) and further returning said CRFG via a re-humidifier (19), through said LTHE (17) and further via said HTHE (14) and to said expander (10) and generating electrical energy at generator (8) connected to said expander (10);

leading said $CO_2$-enriched absorber solution from said $CO_2$-absorber (20) to a $CO_2$-stripper (21) and exporting $CO_2$ to a $CO_2$-compressor (26) to a $CO_2$-export line (28) to onboard $CO_2$ pressure storage tanks, heating said $CO_2$-stripper (21) using a re-boiler (22), circulating said thermal fluid from said exit (5) and further returning cooled $CO_2$-lean absorber fluid to a pump feeding an absorbent ($K_2CO_3$/water) heat exchanger (23) back to the top of said absorber columns (20).

Figure 2:
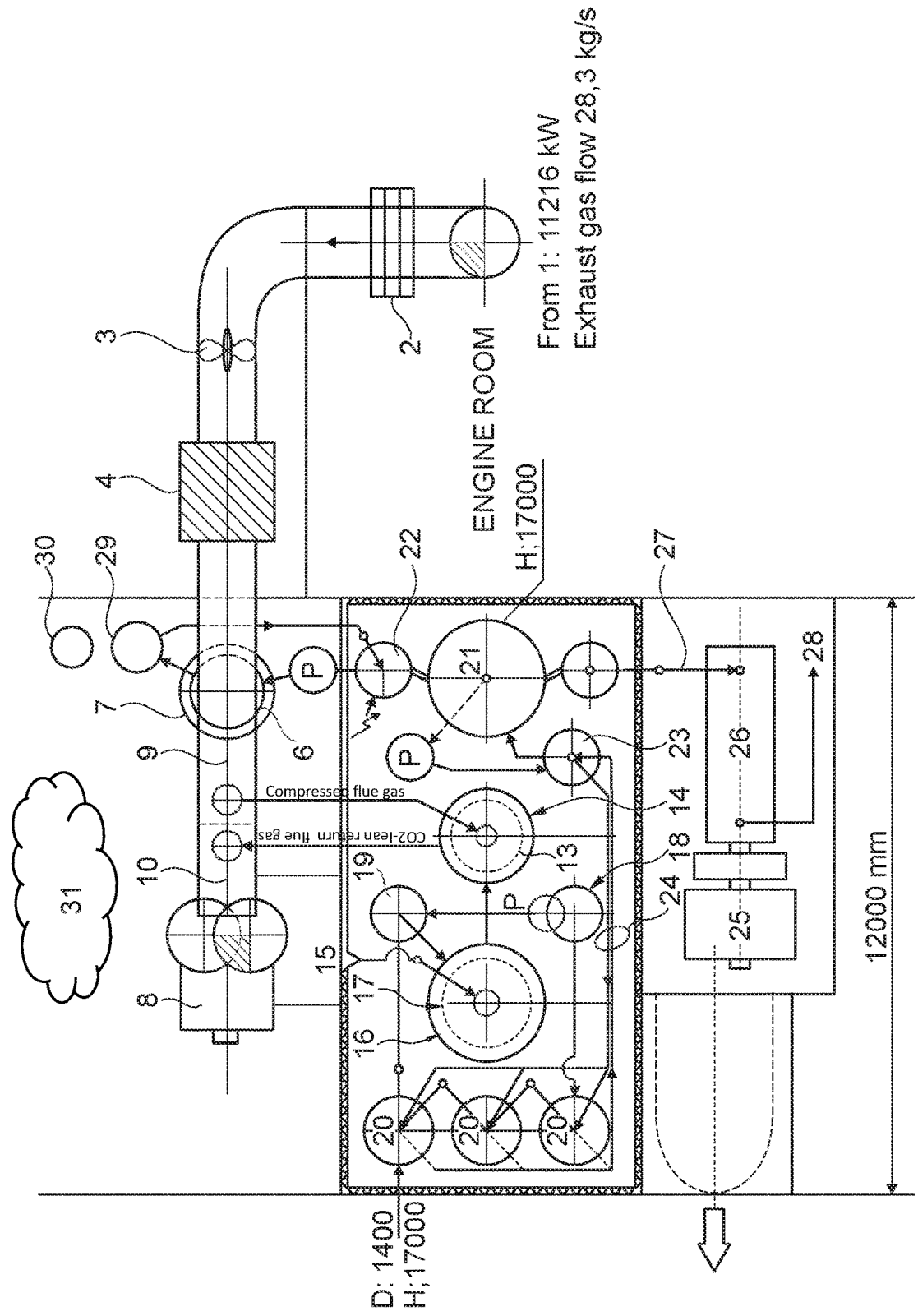
FIG. 2 is a simplified plan view of a stern of a vessel with an embodiment of a flue gas carbon dioxide capture and storage plant according to the disclosure.

The ship comprises a number of technical features illustrated in the attached drawings FIG. 1 and FIG. 2.

A main engine (1) such as a slow running engine (1) such as a diesel engine or a gas driven engine (1) provides flue gas (FG).

The flue gas (FG) is led to an exhaust block and bleed valve unit (2).

The flue gas is led through an exhaust fan (3), if such exhaust fan is required, and through an optional self-cleaning filter (4).

The flue gas (FG) is then led through a flue gas heat exchanger (6) with a thermal fluid exit (5) to a re-boiler (22), said flue gas heat exchanger (6) arranged for cooling said flue gas (FG).

The so cooled flue gas (FG) is further led through a flue gas cooler (7) with vapour drain, providing further cooled flue gas (FG) of e.g. 30 Celsius.

The cooled flue gas (FG) is then led into a compressor (9) compressing it up to a compressed flue gas (CFG) of e.g. 12 Bar and e.g. 355 Celsius.

The compressor (9) is optionally a turbine compressor of a converted gas turbine, which compressor (9) is common-axial with a turbine expander (10), said expander (10) for expanding resulting $CO_2$-reduced flue gas (CRFG), which is the resulting flue gas to be released from the ship. It is relatively easy to convert such a turbine.

The compressed flue gas (CFG) led into a high pressure shell of a HTHE (14) and further to a connected high pressure shell of a combustion chamber (13). Thus, the high pressure shell is not subject to excess, structure destructive temperatures.

The combustion chamber (13) is enveloped by a perforated inner wall for receiving said compressed flue gas (CFG), said perforated inner wall enveloped by said relatively cooler high pressure shell.

The combustion chamber (13) is provided with a fuel feed (11) and a pre-mix gas burner (12) for afterburning said compressed flue gas (CFG). Advantageously, In this combustion chamber the afterburning process of said CFG also burns out remaining methane from said slow running diesel engine.

The afterburning process results in hot afterburned compressed flue gas (ACFG) thus enriched in $CO_2$, e.g. of 600 Celsius.

The afterburned compressed flue gas (ACFG) is heat exchanged in said HTHE (14) with returning resulting $CO_2$-reduced flue gas (CRFG), which $CO_2$-reduced flue gas (CRFG) as such shall be heated to e.g. 550 Celsius to go to said turbine expander (10).

In the HTHE the afterburned compressed flue gas (ACFG) is cooled to e.g. 350 Celsius.

The cooled, afterburned compressed flue gas (ACFG) is run through an SCR (16) reducing its NOx content.

The afterburned, compressed flue gas (ACFG) is further cooled through a Low-temperature heat exchanger LTHE (17). The LTHE (17) heat exchanges with said cool, e.g. 140 Celsius returning resulting $CO_2$-reduced flue gas (CRFG) to e.g. 300 Celsius which shall go further back to said HTHE (14).

The cooled, afterburned compressed flue gas (ACFG) is further cooled in a condenser (18) to e.g. 136 Celsius.

The cooled afterburned compressed flue gas (ACFG) is sent through one or more $CO_2$-absorber columns (20) exchanging $CO_2$ into a $K_2CO_3$/water solution, forming $CO_2$-reduced flue gas (CRFG) which is returned at e.g. 94 Celsius via a re-humidifier (19), via at e.g. 140 Celsius through said LTHE (17) and further at e.g. 300 Celsius via said HTHE (14) to about 550 Celsius and to said expander (10). We may generate electrical energy at generator (8).

The $CO_2$-absorber (20) leads said $CO_2$-enriched absorber solution to a $CO_2$-stripper (21) operating at e.g. 1 Bar and exports $CO_2$ to a $CO_2$-compressor (26) to a $CO_2$-export line (28) to onboard $CO_2$ pressurized storage tanks.

The $CO_2$-stripper (21) is heated by means of a re-boiler (22) circulating thermal fluid from said exit (5) and returning cooled $CO_2$-lean absorber fluid to a pump and an absorbent ($K_2CO_3$/water) heat exchanger (23) back to the top of said absorber columns (20) for renewed absorption of $CO_2$.

After combustion in the main engine (1), the flue gas (oxygen content abt. 14.8%) will be directed to and burned in the combustion chamber (13)/boiler under pressure.

COMPONENTS LIST

1 Slow running marine diesel engine, e.g. 11216 kW with exhaust gas flow 28.3 kg/s
2 Exhaust block with bleed valves
3 exhaust fan
4 Self-cleaning filter
5 Thermic fluid exit to re-boiler (22)
6 Flue gas heat exchanger
7 Flue gas cooler with vapour drain
8 Electric generator/start engine
9 Flue gas compressor
10 Flue gas expander [opt. on common axle]
11 Fuel feed to burner (12)
12 Pre-mix gas burner (e.g. Siemens HR3)
13 Combustion chamber with inner perforated shall and outer pressure shell, exhaust cooled)
14 High Pressure High Temperature HPHT heat exchanger
15 SCR liquid solution storage tank, such as urea/water
16 SCR selective catalytic reduction unit
17 Low Temperature Heat Exchanger gas/gas
18 Condenser
19 Re-humidifier
20 Absorption columns at pressure, operating at e.g. between 11 and 12 Bar
21 $CO_2$-stripper op. at e.g. 1 Bar
22 Re-boiler receiving thermic fluid from exit (5) of flue gas heat exchanger (6)
23 Absorbent (K2CO3/water) heat exhanger
24 Absorbent fluid pipes
25 Electric motor
26 $CO_2$-compressor
27 $CO_2$ gas pipe
28 $CO_2$ liquid pipe to storage tanks
29 Thermic fluid expansion tank
30 Cooling water pump
31 Switchboard and control room.

The disclosed embodiments improve the functionality and operation of a slow running main engine (1), especially under low load operation. After combustion in the main engine (1), the flue gas (oxygen content abt. 14.8%) will be directed to and burned in a combustion chamber (13) under pressure.

The afterburner combustion chamber (13) has two main functions, firstly, to generate heat for the $CO_2$ capture system's re-boiler (22), said afterburner heats up the $CO_2CO_2$-reduced flue gas (CRFG) in the HTHE (14) to about 550 Celsius before the $CO_2$-reduced flue gas enters the expander (10) to generate electrical energy at generator (8), such as the electrical energy produced is used to heat up said re-boiler (22) through an electrical heating element in said re-boiler (22), which heats the $CO_2$-stripper (21), and secondly, to burn out residual methane. A significant problem of a slow running marine diesel engine is that it has functional "Dead Space" in the cylinder and parts of the piston. Consequently, incomplete combustion of methane can hardly be avoided without additional combustion.

Further, the capacity of the re-boiler (22) can be increased in order to comply with energy required for cargo tank heating and energy for the cargo pumps (EI or steam driven)

Additional combustion of the flue gas in the afterburner combustion chamber (13)/boiler will secure full burn out of the methane. This is achieved by long reaction time in the combustion chamber, at a temperature well above methane self-ignition temperature.

The invention claimed is:

1. A flue gas carbon dioxide capture and storage plant, comprising
a main engine arranged for providing a flue gas (FG),
an exhaust block and bleed valve unit for said flue gas (FG) arranged in an exhaust funnel; —an exhaust fan arranged after said exhaust block and bleed valve unit,
a flue gas heat exchanger with a thermal fluid exit arranged for feeding a re-boiler and configured for cooling said flue gas (FG),
a flue gas cooler arranged after the flue gas heat exchanger for cooled flue gas (FG) having a vapour drain and being configured to further cool the flue gas (FG) and yield further cooled flue gas (FG),
a compressor arranged after the flue gas cooler for compressing said further cooled flue gas (FG) up to a compressed flue gas (CFG), said compressor having a common axis with an expander arranged for expanding resulting $CO_2$-reduced flue gas (CRFG),
a high pressure shell of a High Temperature Heat Exchanger (HTHE) arranged after said compressor and further connected to a high pressure shell of a combustion chamber also arranged for said compressed flue gas (CFG), said combustion chamber being enveloped by a perforated inner wall arranged for receiving said compressed flue gas (CFG) and comprising a fuel feed and a pre-mix gas burner arranged for afterburning said compressed flue gas (CFG) and for burning out remaining methane from said main engine, wherein
a self-cleaning filter is arranged before the flue gas heat exchanger, the flue gas cooler, the compressor, and the high pressure shell of the HTHE,
the combustion chamber is arranged to result in hot afterburned compressed flue gas (ACFG) thus enriched in $CO_2$,
the afterburned compressed flue gas (ACFG) is arranged to be heat exchanged in said HTHE with returning resulting $CO_2$-reduced flue gas (CRFG), which is arranged to heat $CO_2$-reduced flue gas (CRFG) and further lead said heated $CO_2$-educed flue gas (CRFG) to said expander,
the HTHE cools said afterburned compressed flue gas (ACFG),
the HTHE is connected to an SCR arranged for reducing an NOx content of said cooled afterburned compressed flue gas (ACFG),
a Low Temperature Heat Exchanger (LTHE) is arranged for further cooling of said afterburned compressed flue gas (ACFG),
the LTHE is arranged for heat exchanging with said cooled returning resulting $CO_2$-reduced flue gas (CRFG) which goes to said HTHE,
a condenser is arranged for further cooling of said cooled, afterburned compressed flue gas (ACFG) and further arranged for conducting said cooled afterburned compressed flue gas (ACFG) sent through one or more $CO_2$-absorber columns arranged for exchanging $CO_2$ into a K2CO3/water solution and forming said $CO_2$-reduced flue gas (CRFG) and a $CO_2$-enriched absorber solution and further arranged to return said CRFG via a re-humidifier, through said LTHE and further via said HTHE and to said expander which is arranged for generating electrical energy at generator;
the $CO_2$-absorber is arranged for leading said $CO_2$-enriched absorber solution to a $CO_2$-stripper and for exporting $CO_2$ to a $CO_2$-compressor to a $CO_2$-export line to onboard $CO_2$ pressure storage tanks,
a re-boiler is arranged for heating said $CO_2$-stripper circulating said thermal fluid from said exit and for returning cooled $CO_2$-lean absorber fluid to a pump arranged for feeding an absorbent, K2CO3/water, heat exchanger back to the top of said $CO_2$ absorber columns.

2. The flue gas carbon dioxide capture and storage plant according to claim 1, wherein the main engine is a slow running diesel or gas driven engine.

3. The flue gas carbon dioxide capture and storage plant according to claim 1, wherein said expander generates energy at the generator and is arranged to supply said re-boiler with electrical energy through a power cable to an electrical heating element in said re-boiler.

4. The flue gas carbon dioxide capture and storage plant according to claim 3, wherein said re-boiler is arranged to supply energy required for cargo tank heating and energy for cargo pumps.

5. The flue gas carbon dioxide capture and storage plant according to claim 2, wherein said re-boiler is arranged to supply energy required for cargo tank heating and energy for cargo pumps.

6. The flue gas carbon dioxide capture and storage plant according to claim 1, wherein said re-boiler is arranged to supply energy required for cargo tank heating and energy for cargo pumps.

7. A method for carbon dioxide capture and storage plant onboard a ship, comprising the steps of:
providing a flue gas (FG) by running a main engine;
leading said flue gas (FG) through an exhaust block and bleed valve unit in an exhaust funnel;
leading said flue gas (FG) through an exhaust fan after said exhaust block and bleed valve unit;
leading said flue gas through a self-cleaning filter after said exhaust fan;
leading said flue gas (FG) through a flue gas heat exchanger with a thermal fluid exit feeding a re-boiler after said self-cleaning filter, the flue gas heat exchanger cooling said flue gas (FG) to provide a cooled flue gas (FG);
further cooling said cooled flue gas (FG) in a flue gas cooler, with vapour drain to provide further cooled flue gas (FG);
compressing said further cooled flue (FG) in a compressor up to a compressed flue gas (CFG), said compressor being having a common axis with an expander arranged for expanding resulting $CO_2$-reduced flue gas (CRFG);
feeding said compressed flue gas (CFG) into a high pressure shell of a High Temperature Heat Exchanger (HTHE), said high pressure shell of said HTHE being further fluid connected to a high pressure shell of a combustion chamber;
feeding said compressed flue gas (CFG) through a perforated inner wall enveloping said combustion chamber;
afterburning said compressed flue gas (CFG) in said combustion chamber using a fuel feed and a pre-mix gas burner, which also burns out remaining methane from said main engine, thereby resulting in hot afterburned compressed flue gas (ACFG) enriched in $CO_2$;
heat exchanging said afterburned compressed flue gas (ACFG) in said HTHE producing returning resulting $CO_2$-reduced flue gas (CRFG), thus heating said $CO_2$-reduced flue gas (CRFG);
leading said heated $CO_2$-reduced flue gas (CRFG) to said expander, wherein
said HTHE cools said afterburned compressed flue gas (ACFG),
an NOx content of said cooled afterburned compressed flue gas (ACFG) is reduced in an SCR connected from said HTHE,
said afterburned compressed flue gas (ACFG) is further cooled in a Low Temperature Heat Exchanger (LTHE), thereby heat exchanging said afterburned compressed flue gas (AFCG) with said cooled returning resulting $CO_2$-reduced flue gas (CRFG) which is conducted to said HTHE,
said cooled, afterburned compressed flue gas (ACFG) is further cooled in a condenser,
cooled afterburned compressed flue gas (ACFG) is conducted through one or more $CO_2$-absorber columns exchanging $CO_2$ into a K2CO3/water solution and forming $CO_2$-reduced flue gas (CRFG) and a $CO_2$-enriched absorber solution, and said CRFG is returned via a re-humidifier through said LTHE and further via said HTHE and to said expander, thereby generating electrical energy at generator connected to said expander;
said $CO_2$-enriched absorber solution is led from said $CO_2$-absorber to a $CO_2$-stripper and $CO_2$ is exported to a $CO_2$-compressor to a $CO_2$-export line to onboard $CO_2$ pressure storage tanks, said $CO_2$-stripper is heated using a re-boiler, circulating said thermal fluid from said exit and further returning cooled $CO_2$-lean absorber fluid to a pump feeding an absorbent, K2CO3/water, heat exchanger back to the top of said $CO_2$ absorber columns.

8. The method according to claim 7, wherein said afterburner heats up the $CO_2$-reduced flue gas (CRFG) in the HTHE before the $CO_2$-reduced flue gas enters the expander to generate electrical energy at generator, and the electrical energy produced is used to heat up said re-boiler through an electrical heating element in said re-boiler.

* * * * *